United States Patent [19]

Buess

[11] 4,445,044

[45] Apr. 24, 1984

[54] ANGULAR POSITION TRANSDUCER HAVING A BIPOLAR ANALOG OUTPUT SIGNAL

[75] Inventor: Laverne E. Buess, Tallmadge, Ohio

[73] Assignee: L. E. Buess, Inc., Tallmadge, Ohio

[21] Appl. No.: 279,783

[22] Filed: Jul. 2, 1981

[51] Int. Cl.³ .............................................. G01V 9/04
[52] U.S. Cl. ................................. 250/561; 242/75.52; 250/231 SE
[58] Field of Search ......... 250/211 K, 231 SE, 214 C, 250/210, 561, 231 R; 242/75.52; 226/44; 352/14

[56] References Cited

U.S. PATENT DOCUMENTS

| | | | |
|---|---|---|---|
| 2,166,551 | 7/1939 | Perry | 250/561 |
| 3,092,764 | 6/1963 | Cooper | 318/6 |
| 3,229,175 | 1/1966 | Strandberg | 318/6 |
| 3,235,150 | 2/1966 | Francis | 226/44 |
| 3,322,315 | 5/1967 | Eberlin | 226/44 |
| 3,409,240 | 11/1968 | Moritz | 242/55.12 |
| 3,474,311 | 10/1969 | Lewis, Jr. | 318/6 |
| 3,598,999 | 8/1971 | Hofmeister | 250/231 R |
| 3,775,617 | 11/1973 | Dubauskas | 250/231 R |
| 3,807,613 | 4/1974 | Holm | 226/42 |
| 3,901,590 | 8/1975 | Ashida | 352/14 |
| 3,912,145 | 10/1975 | Meihofer | 226/44 |
| 3,968,364 | 7/1976 | Miller | 250/231 R |
| 4,011,976 | 3/1977 | Greer | 226/8 |
| 4,153,835 | 5/1979 | Lau et al. | 250/214 C |
| 4,180,931 | 1/1980 | Osch | 250/211 K |

Primary Examiner—David C. Nelms
Assistant Examiner—J. Brophy
Attorney, Agent, or Firm—Renner, Kenner, Greive & Bobak

[57] ABSTRACT

A device for providing an indication of the position of a material (80) within a conveyor system includes a dancer roller (83) for engaging the material (80) and bidirectionally varying its angular position relative to a preselected axis, and a transducer (10) operatively connected via a shaft (15) to the dancer roller (83). Transducer (10) includes a plurality of light emitting diodes (21,22) and phototransistors (23,24) mounted in spatial relation upon a plate (33) perpendicularly fixed to the shaft (15) and adjustably carrying a plurality of light cams (34,35) interposed between the light emitting diodes (21,22) and the phototransistors (23,24). As the angular position of shaft (15) is varied by dancer roller (83), illumination upon phototransistors (23,24) similarly proportionally varies. A circuit (61) receiving the output of phototransistors (23,24) generates a bipolar electrical signal having a voltage magnitude proportional to the angular deviation of the dancer roller (83) from the preselected axis and a polarity dependent upon the direction of such angular deviation.

12 Claims, 5 Drawing Figures

ANGULAR POSITION TRANSDUCER HAVING A BIPOLAR ANALOG OUTPUT SIGNAL

TECHNICAL FIELD

The present invention relates generally to a transducer for monitoring the angular position of a member. More particularly, the present invention pertains to a transducer for monitoring the angular position of a shaft and providing a bipolar analog output signal. More specifically, the present invention concerns a transducer for monitoring the position of a strip of material as it loops onto a conveyor and providing a bipolar analog output signal proportional to its bidirectional deviation from a preselected reference position.

BACKGROUND ART

Monitoring and regulating the tension in a material is necessary in innumerable arts. For example, in the tire industry, it is important that heated uncured or "green" rubber be given a chance to relax and not exceed a preselected tension before it is cut into lengths which form tire components, or else when assembled these cut pieces will not be of the correct length. Relaxation is accomplished by transporting a strip of uncured rubber down a plurality of cooling conveyors arranged in series at progressively lower heights. As the rubber strip "steps" from one conveyor to the next, the various conveyor speeds are adjusted to maintain a shallow loop in the strip providing near zero tension therein and facilitating such relaxation.

In order to insure that such relaxation is continuously maximized, transducers have been provided to monitor the position of the rubber strip (and thereby monitor the profile of the loop) as it is transported from one conveyor to the next. Typically these transducers were simply either a conventional potentiometer, a control transformer with a rotatable secondary, or an A.C. reactor with a movable iron core. Since these transducers are interconnected with conveyor speed control circuitry requiring D.C. operation, the latter two devices, which had to be operated in an A.C. environment, required special circuitry for conversion to and compatibility with a D.C. system.

In other arts transducers for monitoring and regulating the position of a material have employed dancer rollers acting through various linkage mechanisms to control light passing from a lamp to a light sensitive element that generates a discrete electrical signal when the light was incident thereupon. For example, in U.S. Pat. No. 3,092,764 a photoelectric tension sensing motor control circuit is disclosed as having a notched light filter disc fixed to a dancer roller to discretely control light from a single light source to two photocells based upon the tension of a web or strand collecting on a take-up roll. However, conveyor speed control circuitry ideally operates with a single, analog, bipolar D.C. signal which conveys not only information regarding position of the dancer roller, but its direction from a preselected reference axis, something a device as that disclosed in U.S. Pat. No. 3,092,764 is incapable of furnishing.

DISCLOSURE OF THE INVENTION

It is, therefore, an object of the invention to provide a transducer for monitoring the angular position of a member and providing a bipolar analog output signal indicative of the distance and direction of the member relative to a preselected reference axis.

It is another object of the invention to provide a transducer, as set forth above, with minimal components and shielded within a single housing.

It is yet another object of the invention to provide a transducer, as set forth above, suitable for monitoring position of a material within a conveyor system and providing the bipolar analog output signal proportional to such position.

It is still another object of the invention to provide a transducer, as set forth above, having a sealed bearing capable of directly and solely supporting a dancer roller in contact with the material whose position is to be monitored.

These and other objects and advantages of the present invention over existing prior art forms will become more apparent and fully understood from the following description in conjunction with the accompanying drawings.

In general, a device for providing an indication of the position of a material within a conveyor system includes a dancer roller for engaging the material and bidirectionally varying its angular position relative to a preselected axis, and a transducer operatively connected to the dancer roller assembly for generating a bipolar electrical signal having an electrical characteristic whose magnitude is proportional to the angular deviation of the dancer roller from the preselected axis and whose polarity is dependent upon the direction of the angular deviation relative to the preselected axis.

PREFERRED EMBODIMENT FOR CARRYING OUT THE INVENTION

Figure 1:
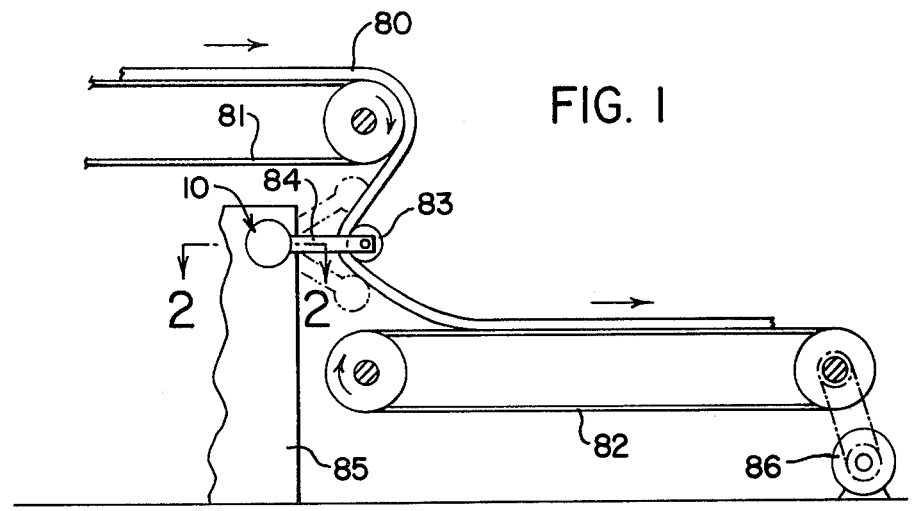
FIG. 1 is an elevational view of a transducer embodying the concepts of the present invention in an exemplary environment of monitoring the tension of an elastic material upon a conveyor line.
Figure 2:
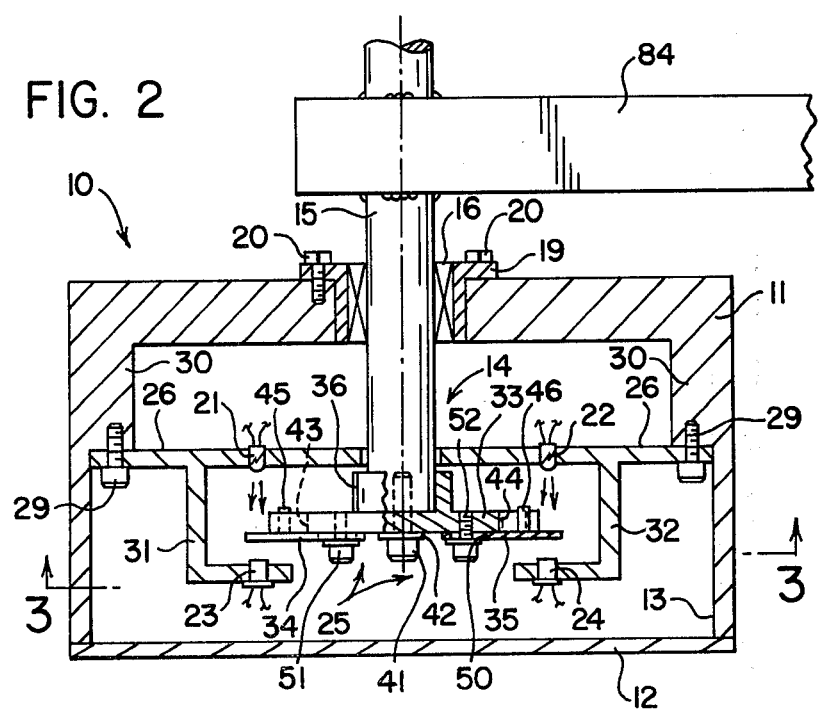
FIG. 2 is a sectional view of the transducer taken substantially along line 2—2 of FIG. 1.

FIGS. 1 and 2 illustrate a device embodying the concepts of the present invention, generally indicated by the numeral 10 and hereinafter referred to as a transducer, for generating a bipolar electrical signal indicative of the direction and magnitude of the angular deviation of a rotatable object from a reference or "zero"

rotational position. In this depicted embodiment transducer 10 includes a somewhat cup-shaped generally cylindrical housing 11 closed at one extremity by a closure plate 12 which may be affixed to housing 11 by any suitable means including adhesion or by removable fastners (not shown) so as to facilitate entry into an interior annular chamber formed by inner wall 13 of housing 11. These structural units may be formed of an opaque material such as any one of a number of metals, woods or colored plastics which would occur to persons skilled in the art. Although for convenience the transducer 10 is depicted and shall hereinafter be referred to in the description with the longitudinal axis of cylindrical housing 11 as the "horizontal axis", it should be appreciated that the transducer may be mounted and will operate equally well in any attitudinal position.

As best shown in FIG. 2, the operational elements of transducer 10 include a rotational position monitoring assembly, generally indicated by the numeral 14, and a shaft 15 which extends along the horizontal axis through cylindrical housing 11 and into its interior annular chamber. Shaft 15 is rotatably carried in cylindrical housing 11 by a cylindrical bearing 16 affixed to a cylindrical collar 19 having a flange mounted to cylindrical housing 11 either permanently, as by adhesion, or removably, as by screws 20. Cylindrical bearing 16 preferably should be of sufficient strength to support the desired dancer roller arrangement, an exemplary configuration for which is discussed hereinafter.

Rotational position monitoring assembly 14 includes light emitting diodes (LEDs) 21, 22, phototransistors 23, 24, light cam assembly 25, and substantially circular mounting plate 26. Mounting plate 26 is secured (by, for example, removable screws 29 or other acceptable means) to an annular boss 30 integrally formed in inner wall 13 of housing 11, and extending toward but not in contact with closure plate 12. Shaft 15 passes through an aperture of suitable diameter in the center of mounting plate 26, and terminates in the space between mounting plate 26 and closure plate 12. Two generally "L" shaped arms 31, 32 are integrally formed in mounting plate 26 radially equidistant from the center of mounting plate 26 and with one side of each arm 31, 32 parallel to mounting plate 26 and directed radially inwardly toward shaft 15. LEDs 21, 22 are mounted in mounting plate 26 beneath arms 31, 32 respectively such that illumination is projected to be respectively received by phototransistors 23, 24 mounted in arms 31, 32 in alignment with LEDs 21, 22.

Figure 3:
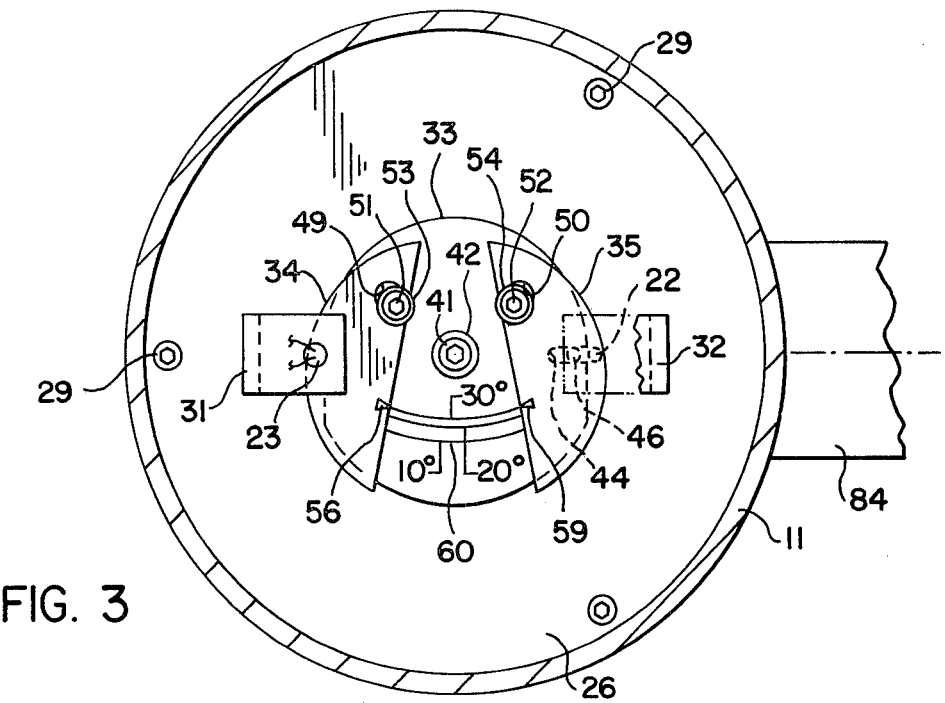
FIG. 3 is a sectional view of the transducer taken substantially along line 3—3 of FIG. 2 showing particularly the spatial relation of the transducer's light emitting diodes, phototransistors and light cams interposed therebetween when the shaft of the transducer is in a reference or "zero" rotational position.

Referring now to FIGS. 2 and 3, light cam assembly 25 may be seen to include a base plate 33 and two semicircular cams 34, 35. Base plate 33 is a generally circular disk having a first smaller radius (no greater than the distance from the center of shaft 15 to the radially inner most edge of one of LEDs 21, 22) for its upper half (as pictured in FIG. 3), a second, larger radius (no less than the distance from the center of shaft 15 to the radially outermost edge of one of LEDs 21, 22) for its lower half, and a central hub 36 (illustrated in FIG. 2) integral therewith for placement over the end of shaft 15.

Base plate 33, again as shown in FIG. 3, has a small portion of its right and left sides removed, and includes two slots 43, 44 cut partly inwardly toward the center for each truncated side and along the center cord between the two halves. Cams 34, 35 respectively include pivot pins 45, 46 positioned radially outwardly upon the central axis of that cam, and holes 49, 50 positioned radially inwardly in the upper portion of that cam. Screws 51, 52 having a head diameter significantly less than that of holes 49, 50 respectively pass through flat washers 53, 54 of a diameter substantially equal to that of holes 49, 50 for threadable engagement with suitably tapped bores in base plate 33.

Figure 4:
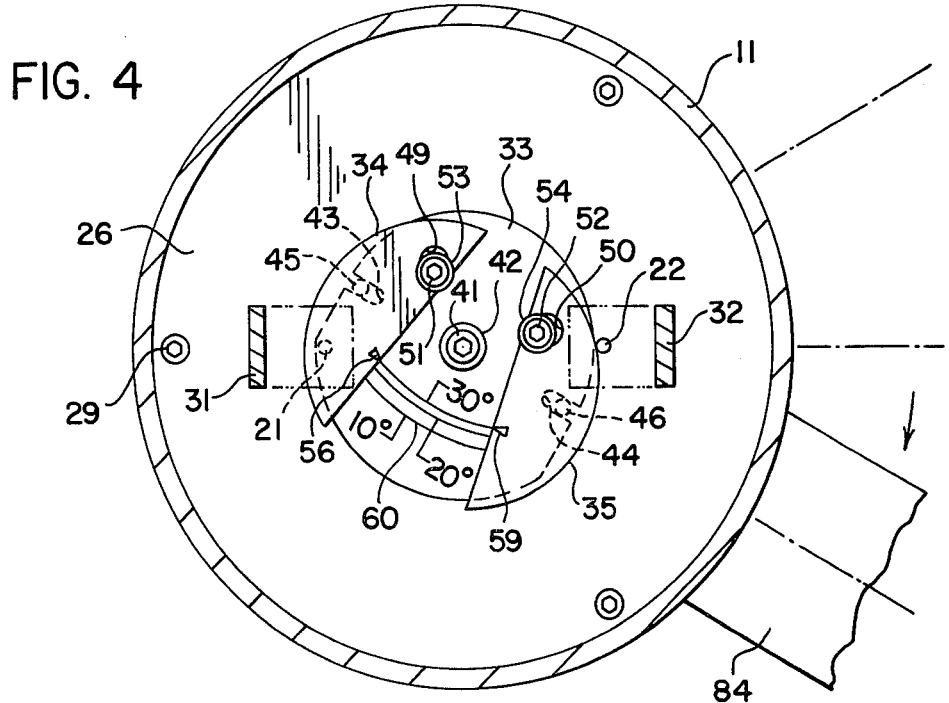
FIG. 4 is a sectional view of the transducer taken substantially along line 3—3 of FIG. 2 showing particularly the spatial relation of the transducer's light emitting diodes, phototransistors and light cams interposed therebetween when the shaft of the transducer is at an angle of 30° relative to its reference or "zero" rotational position.

Cams 34, 35 may be adjusted by pivoting respectively about pins 45, 46 and sliding within slots 43, 44, thereby controlling the amount of illumination received by phototransistors 23, 24 respectively from LEDs 21, 22. Screws 49, 50 limit the extent of both such pivoting and sliding dependant upon the relative location and diameter of the screws 49, 50 to holes 53, 54. Where it is desirable, for example, for phototransistor 24 to receive the maximum possible illumination from LED 22 when shaft 15 is at a 30° angular deviation beneath the horizontal reference axis, shaft 15 may be positioned at this angle and cam 35 adjusted such that its circular periphery is at a point immediately radially inward of LED 22 and phototransistor 24 (see FIG. 4). As shaft 15 is rotated back toward its zero position, cam 35 continuously progressively interposes itself between LED 22 and phototransistor 24, proportionally reducing the illumination received by phototransistor 24 until it is entirely shielded from LED 22 (which occurs whenever shaft 15 is at its zero position, or is further rotated at any angle above the horizontal reference axis). Cam 34 should be similarly adjusted to act opposite that of cam 35, shielding phototransistor 23 from LED 21 whenever shaft 15 is at any angle beneath the horizontal reference axis or is aligned therewith, and continuously progressively interposing itself between LED 21 and phototransistor 23, proportionally reducing the illumination received by phototransistor 23 until it is reduced to zero at the preselected angle below the horizontal reference axis.

A visual indicating scale 55 may be included upon base plate 33 to facilitate adjustment of cams 34 and 35 to provide the desired range of variation in the illumination received by phototransistors 23, 24. Visual indicating scale 55 includes markers 56, 59 respectively arbitrarily located upon the inner diameter of cams 34, 35, and a plurality of graduations 60 denoting the angle of shaft 15 at which the phototransistors 23, 24 will cease receiving illumination. The geometry of graduations will of course vary as the shape, pivot and sliding axes of cams 34, 35 are altered, and may be emperically determined or otherwise found, as by calculation.

Figure 5:
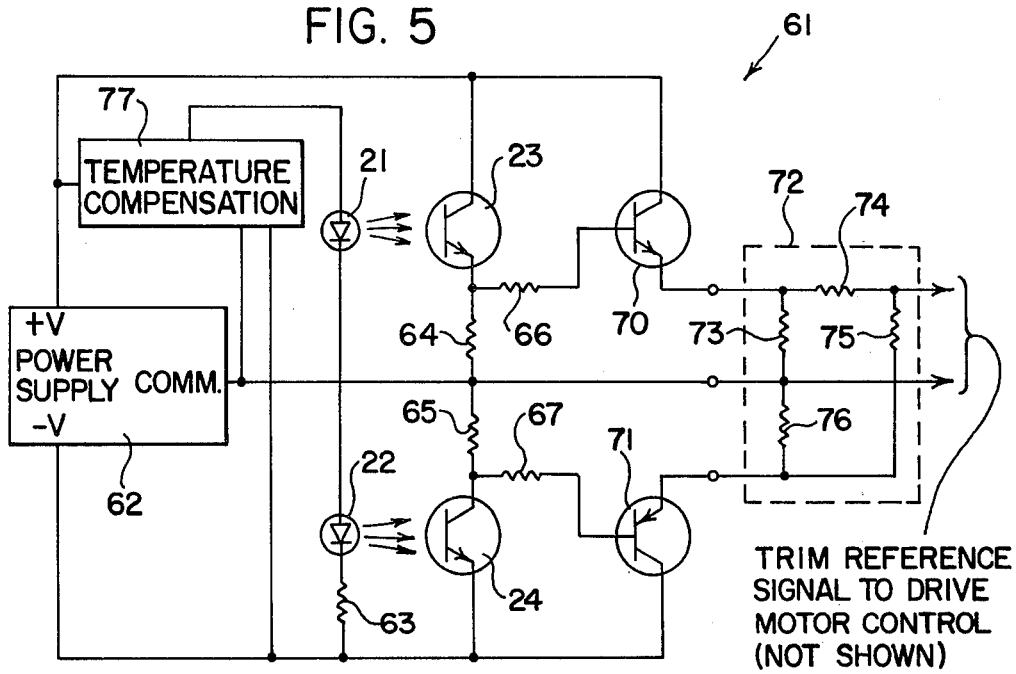
FIG. 5 is a schematic diagram of an exemplary circuit including the light emitting diodes and phototransistors for generating a bipolar electrical signal whose voltage magnitude is proportional to the rotational deviation of the shaft from its reference or "zero" rotational position and whose polarity is dependant upon the direction of such rotational deviation.

Turning now to FIG. 5 an exemplary circuit, generally indicated with the numeral 61, is presented for generating a unipolar electrical signal whose voltage magnitude is proportional to the rotational deviation of shaft 15 from its horizontal reference position and whose polarity is dependant upon the direction of such rotational deviation. Circuit 61 includes a bi-polar power supply 62, LEDs 21 and 22, resistor 63, phototransistors 23 and 24, biasing resistors 64, 65, 66, and 67, transistors 70 and 71, and resistor bridge network 72 having resistors 73, 74, 75, and 76 therein. Where preferred, circuit 61 may include any conventional temperature compensation circuit 77 to preclude adverse variations with temperature in the illumination provided by LEDs 21 and 22.

Bipolar power supply 62 may be any conventional D.C. power supply generating a range of voltages suitable for operation of the remaining circuitry and furnishing a common terminal at the mid-point of the supplied range of voltages. While LEDs 21, 22 and phototransistors 23, 24 may be chosen from any such conventional component, it should be appreciated that circuit 61 and transducer 10 may be made to work equally well with any light source and light sensor that may be configured as previously explained. Phototransistors 23, 24 and general purpose amplifier transistors 70, 71 may be chosen from any such conventional component of the junction type (i.e., NPN or PNP) denoted in FIG. 5.

Temperature compensation circuit 77 is electrically connected to all three terminals (+V, −V, and Common) of bipolar power supply 62, and has its output electrically connected to the anode of LED 21. The cathode of LED 21 is electrically connected to the anode of LED 22, whose cathode is in turn electrically connected through resistor 63 to the −V terminal. The collector of phototransistor 23 is electrically connected to the +V terminal while its emitter is electrically connected through resistor 64 to the common terminal of bipolar power supply 62. Phototransistor 24 is electrically connected through resistor 65 in a symetrical manner between the common terminal of bipolar power supply 62 and its −V terminal.

The emitter of phototransistor 23 and the collector of phototransistor 24 are respectively electrically connected through resistors 66, 67 to the bases of transistors 70, 71, the collectors of the latter respectively electrically connected to the +V and −V terminals of power supply 62. Resistors 73, 74, 75 and 76 are all electrically connected in series in typical bridge fashion. The emitters of transistors 70, 71 are respectively electrically connected to the junctions between resistors 73 and 74, and between 75 and 76. The output electrical signal is derived across the junctions between resistors 74 and 75, and between resistors 73 and 76, the latter junction also being electrically connected to the common terminal of bipolar power supply 62.

Operation of circuit 61 is straightforward. As discussed hereinabove, for a given rotational deviation cams 34, 35 insure that only one of phototransistors 23, 24 receives illumination. Phototransistors 23, 24 provide an output electrical signal whose voltage magnitude is proportional to the illumination received thereby. Transistors 70, 71, whose bases receive these output electrical signals, simply proportionally amplify the respective output electrical signals from phototransistors 23, 24 and apply the amplified outputs across the input to resistor bridge 72. Since one of the output terminal junctions of resistors bridge 72 is permanently electrically connected to the common terminal of bipolar power supply 62, the output electrical signal from resistor bridge 72 is continuously maintained between zero and +V volts. The voltage divider nature of resistor bridge 72 results in its output having a magnitude of −V volts when the angular deviation of shaft 15 is at its maximum in one direction, zero volts when shaft 15 is in its zero position, and +V volts when the angular deviation of shaft 15 is at its maximum in the opposite direction.

Returning to FIG. 1, transducer 10 is depicted in a typical operational environment in which it is utilized to monitor and provide an electrical signal indicative of tension in a material that must be allowed to "relax" during its conveyor transit. Specifically FIG. 1 illustrates a sheet of uncured or "green" rubber 80 moving down a first conveyor 81 and rolling off the end thereof to be picked up and further moved by a second conveyor 82 positioned in step-fashion below the first conveyor 81. A conventional cylindrical dancer roller 83 extends across rubber 80 at the midpoint of and in the plane of the vertical step, forcing a slight "S" curve in the rubber 80. Dancer roller 83 is mounted upon one end of a limit arm 84 the opposite end of which is affixed by suitable means as would be known to the skilled artisan to shaft 15 of transducer 10, which transducer is supported at the proper height and location by post 85.

In this configuration, the faster the velocity of conveyor 82 (which is controlled by motor 86) relative to that of conveyor 81, the greater the tension in rubber 80 and the further dancer roller 83 will be forced upward. As dancer roller 83 is forced upward, a corresponding change occurs in the rotational position of shaft 15. Similarly, reduction in the tension in rubber 80 will result in dancer roller 83 dropping downward, again with a like response in the shaft 15. Thus, the output electrical signal from transducer 10 may be utilized to monitor the tension in rubber 80, and, where preferred, may be received by a control circuit (not shown) for adjustment of the speed of drive motor 86 to maintain the preselected tension in the same.

Having described an exemplary transducer 10 with which to practice the present invention, it should be appreciated that LEDs 21, 22, phototransistors 23, 24, and light cam assembly 25 may be mounted in any manner so long as an appropriate operative association is maintained between these elements and shaft 15. For example, LEDs 21, 22 and phototransistors 23, 24 have been illustrated herein fixed in alignment parallel to the longitudinal axis of shaft 15, and with light cam assembly 25 perpindicular to the same. Light cams 34, 35 may be affixed to shaft 15 parallel to its longitudinal axis, and the LEDs 21, 22 and phototransistors 23, 24 disposed thereabout in a plane perpendicular to the longitudinal axis of shaft 15, with suitable changes being made in arms 31, 32.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of transducers for monitoring the direction and magnitude of angular deviation in a shaft.

I claim:

1. A device for providing an indication of the position of a material within a conveyor system, comprising:
dancer roller means for engaging the material and bidirectionally varying its angular position relative to a preselected axis; and,
transducer means operatively connected to said dancer roller means for generating a bipolar electrical signal having an electrical characteristic whose magnitude is continuously proportional to said angular deviation of said dancer roller means from said preselected axis and whose polarity is dependent upon the direction of said angular deviation relative to said preselected axis; said transducer means including a plurality of light sensor means aligned with a plurality of light generating means whereby said plurality of light sensor means generate electrical output signals in proportion to the light incident thereupon and further including a plurality of light cam means for continuously adjusting the light incident upon said plurality of light sensor means proportional to said angular deviation of said dancer roller.

2. A device, a set forth in claim 1, wherein said transducer means further includes
a shaft operatively connected to said dancer roller means such that there exists a unique rotational position of said shaft corresponding to each said angular deviation of said dancer roller, and,
a plurality of light cam means for continuously variably adjusting the light incident upon said plurality of light sensor means proportional to said rotational position of said shaft, said light cam means affixed to said shaft and having a shaped edge continuously progressively interposing between said light generating means and said light sensor means.

3. A device, as set forth in claim 2, wherein said transducer means further includes circuit means for receiving said electrical output signals from said light sensor means and generating said bipolar electrical signal, said circuit means including
bipolar power supply means for furnishing power of one polarity to a first said light sensor means and furnishing power of the opposite polarity to a second said light sensor means, and,
bridge means receiving said electrical output signals from both said first light sensor means and said second light sensor means and providing said bipolar electrical signal.

4. A device, as set forth in claims 2 or 3, further including plate means mounted to said shaft, said plurality of light cam means adjustably mounted to said plate means.

5. A device, as set forth in claim 4, wherein said plate means is substantially circular, one semi-circular portion of which has a first radius and the other semi-circular portion of which has a second radius larger than that of said first radius.

6. A device, as set forth in claim 5, wherein said plate means is perpendicularly mounted to the end of said shaft, said plurality of light generating means and said plurality of light sensor means in axial alignment parallel to said shaft on opposite sides of the periphery of said plate means, said plurality of light cam means pivotably and slideably mounted to said plate means such that for a given angular position of said dancer roller the light incident upon said plurality of light generating means may be adjusted.

7. A device, as set forth in claim 6, wherein said transducer means further includes housing means within which said shaft is terminated for isolating all elements thereof from the environment.

8. A device, as set forth in claim 7, wherein said transducer means further includes bearing means coaxial with said shaft and mounted to said housing for rotatably carrying said shaft within said housing, said bearing means of sufficient strength to directly support said dancer roller means.

9. A device, as set forth in claim 7, wherein said transducer means further includes mounting means for carrying said plurality of light generating means and said plurality of light sensor means in axially aligned relation, said mounting means including mounting plate means for carrying one of said plurality of light generating means and said plurality of light sensor means and arm means extending from said mounting plate means for carrying the other of said plurality of light generating means and said plurality of light sensor means.

10. A device, as set forth in claim 7, wherein said transducer means includes scale means upon said plate means for providing a visual indication the angle of said dancer roller at which the said plurality of light sensor means will cease receiving illumination.

11. A device, as set forth in claim 7, wherein said circuit means further includes means for receiving power of both polarities from said bipolar power supply means and compensating for temperature induced variations in said power to said plurality of light generating means.

12. A device, as set forth in claim 11, wherein said plurality of light generating means are light emitting diodes and said plurality of light sensor means are phototransistors.

* * * * *